Figure 5:
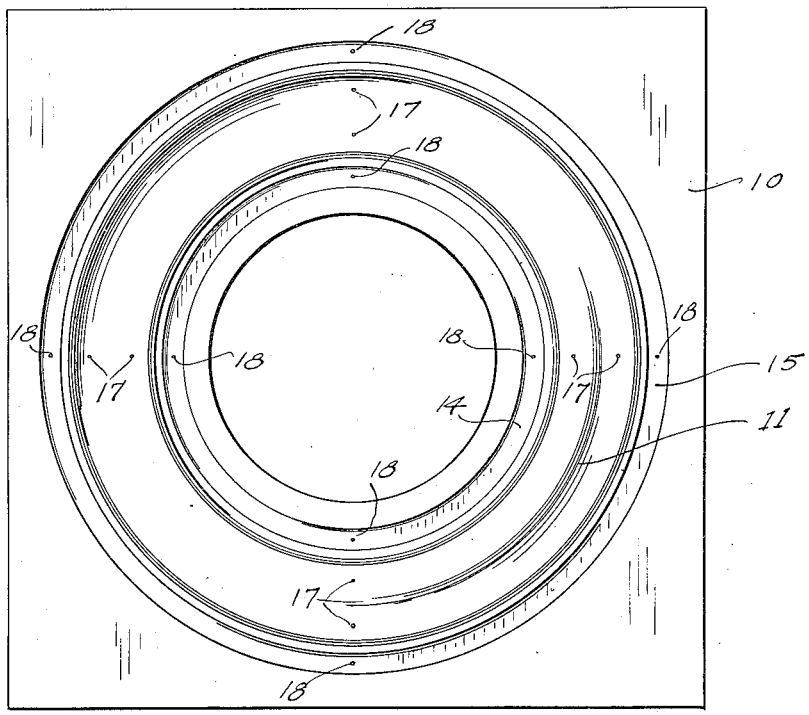

May 15, 1923.
W. E. ROBERTS
1,455,734
INNER TUBE FOR AUTOMOBILE TIRES
Filed Aug. 26, 1921    2 Sheets-Sheet 1
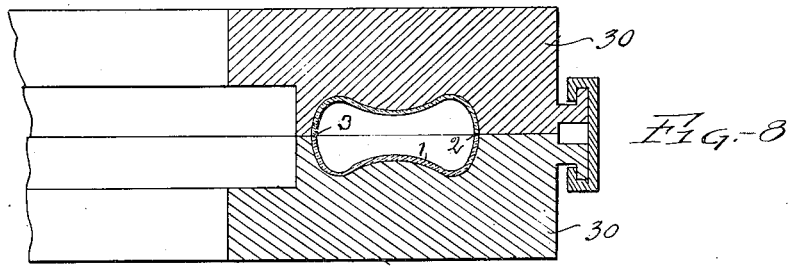
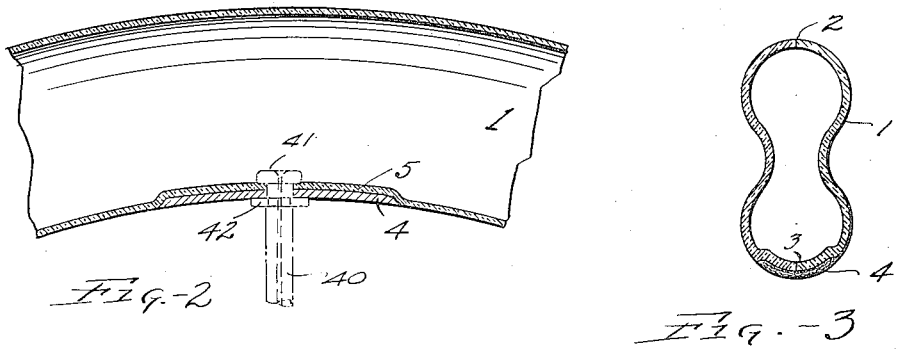
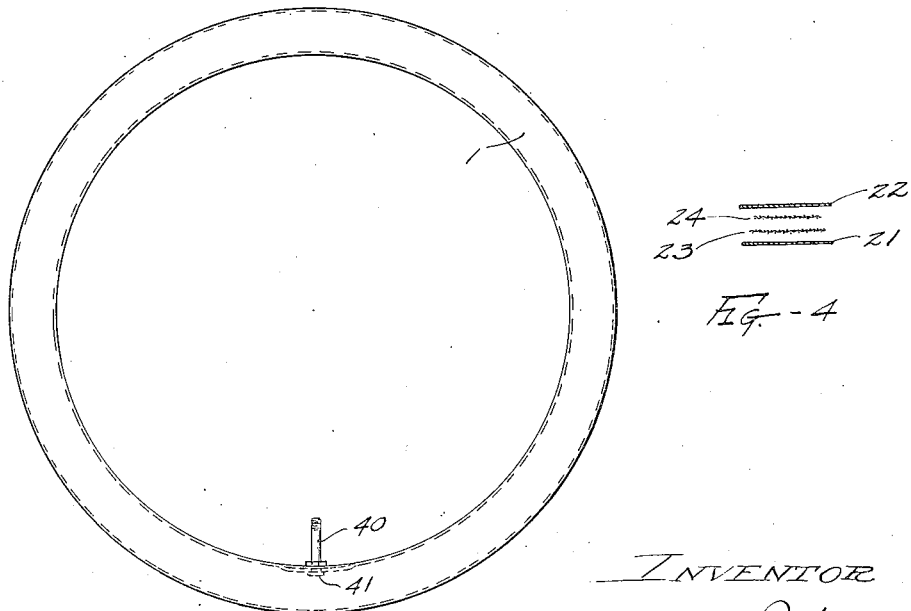
INVENTOR
William E. Roberts,
By Baker & Macklin,
ATTORNEYS Patented May 15, 1923.

1,455,734

UNITED STATES PATENT OFFICE.

WILLIAM E. ROBERTS, OF LITTLE FALLS, NEW JERSEY, ASSIGNOR TO PARAMOUNT RUBBER CONSOLIDATED, INC., OF PHILADELPHIA, PENNSYLVANIA, A CORPORATION OF DELAWARE.

INNER TUBE FOR AUTOMOBILE TIRES.

Application filed August 26, 1921. Serial No. 495,488.

*To all whom it may concern:*

Be it known that I, WILLIAM E. ROBERTS, a citizen of the United States, residing at Little Falls, in the county of Passaic and State of New Jersey, have invented a certain new and useful Improvement in Inner Tubes for Automobile Tires, of which the following is a full, clear, and exact description, reference being had to the accompanying drawings.

This invention relates to inner tubes for automobile tires which are reinforced in the region of the valve nipple. An object is to provide a tube reinforced by an exterior patch which shall be firmly affixed to the tube and shall not loosen during wear and shall not cause pinching or other injurious results to the tube itself. I accomplish the desired result by applying a patch externally, to a raw rubber tube and thereafter vulcanizing them as a unit against a smooth external wall by internal fluid pressure, which results in the tube wall being bowed inwardly to provide a depression to receive the patch and the patch being seated in this depression with its exterior flush with the exterior surface of the tube. The tube thus has a smooth, uninterrupted exterior and the edge of the patch thus abuts the inward bend of the tube wall and is protected by it. The patch becomes a substantially unitary part of the article.

Another feature of my invention comprises making an annular tube of two continuous sheets of rubber joined only by peripheral seams, the patch being applied to the exterior at the inner periphery across the inner seam and sunk within the wall as described.

In the usual way of making an annular tube for automobile tires it is first formed as a straight tube with open ends and this tube is thereafter bent into an annulus and the ends overlapped and cemented together. With such a tube it is possible to place a reinforcing patch on the inside of the tube, either inserting it through one of the open ends before the ends are joined or placing it on the outside of the tube and thereafter turning the tube inside out. Such an internal patch avoids the troublesome wear of the ordinary external patch, but it is not feasible to apply the patch internally if the tube is formed originally as a complete annulus.

To make the tube as a complete annulus has decided advantages in avoiding leakage at cemented seams and preventing undue distortion when the tube is in place and avoiding either buckling along the inner periphery or the undue stretching along the outer periphery, which is incident to a straight tube bent into an annulus.

My invention enables the obtaining of the advantages of both the completely annular tube having only peripheral seams and the internal patch, since I apply the patch in such manner that when the patch is vulcanized to the tube, the exterior is substantially the same as if the patch were on the inside.

In making my new tube I seat raw rubber stock of an annular form pneumatically in two annular mold cavities and then place in one of the seated sections material which will form a fluid pressure when heated—water for instance—and then bring the two seated portions of raw rubber together to form two peripheral seams and shear off the surplus stock. Then while the formed and completely closed annular tube is still in its raw state I apply to the exterior across the inner peripheral seam a patch, and I then vulcanize the combined article in an annular mold with a smooth continuous wall against which the tube and patch are pressed by the internal pressure. This causes the patch to seat flushly within the material of the tube and to be firmly affixed thereto.

In order to fully disclose the properties of an article involving the principles of my invention, I have shown herein the steps by which such an article may be made, as well as such a finished article itself. I do not however, claim in the present application the method by which this article is produced, as this method is disclosed and claimed in my co-pending application, Serial No. 348,094, filed December 29th, 1919, of which the present application is a continuation in part.

The invention with which this application is concerned, comprises reinforced articles as above outlined. This is hereinafter more fully explained and the essential novel features are summarized in the claims.

Figure 6:
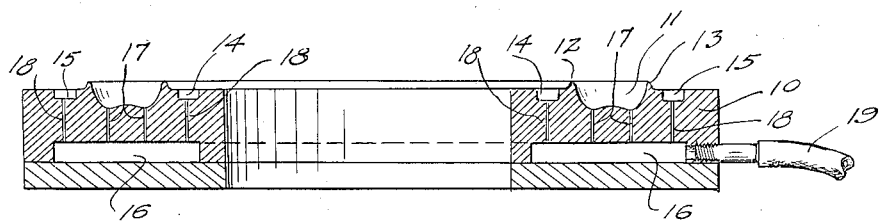
Figure 7:
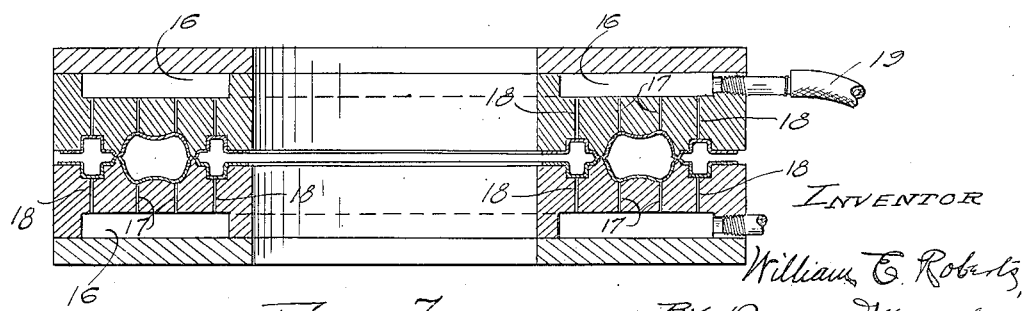

In the drawings, Fig. 1 is a side elevation of an automobile tube embodying my invention; Fig. 2 is a fragmentary central section through such a tube and showing the portion adjacent the valve nipple; Fig. 3 is a cross section of the tube and patch. Fig. 4 is a cross section through different members of the patch in their proper order before they are assembled; Fig. 5 is a plan of a mold which may be employed to form either half of a completely annular tire; Fig. 6 is a cross section of such mold; Fig. 7 is a cross section showing two of such molds brought together with the rubber stock properly seated in each of them; Fig. 8 is a fragmentary cross section through a vulcanizing mold which may be employed.

As shown in Figs. 1, 2 and 3 my tire is composed of two annular trough shaped members 1 which are connected together at their inner and outer peripheries by seams 2 and 3. 4 indicates the reinforcing patch which is mounted on the exterior of the tube and extends across the seam 3 and seats in an inwardly depressed portion 5 of the tube wall.

Figs. 5, 6 and 7 illustrate a tire forming mold as shown and claimed in the application of Fred T. Roberts, No. 323,851, filed September 15, 1919; while a method of making annular tubes involving the employment of such a mold to form a tube with peripheral seams, is claimed in the patent to Fred T. Roberts, No. 1,346,848, issued July 20, 1920.

Referring briefly to Figs. 5 to 7, inclusive, which illustrate a suitable tube forming mold which may be employed for connecting annular pieces along peripheral seams so as to form a tube, 10 indicates a block having an annular cavity 11, the cross sectional contour of which is substantially one-half that of the exterior of the tube to be formed. At the inner and outer edges of this cavity are annular cutting ribs 12 and 13 and beyond these ribs are annular grooves 14 and 15. In the base of the mold members is an annular chamber 16 with which the cavity 11 communicates by passageways 17; and the cavities 14 and 15 by passageways 18.

In the formation of the tube by means of molds described, a sheet of raw rubber is laid over the main cavity and the annular grooves and preferably pressed downwardly. At the annular grooves suction is applied through a pipe 19 drawing the marginal portions of the sheet into the clamping grooves 14 and 15 and drawing the intermediate region of the sheet into the main cavity 11.

When two sheets have been thus seated between two molds, a substance such as ammonia powder or water is placed in the stock seated in one of the molds; then the other mold in inverted position is caused to engage the upwardly facing mold as shown in Fig. 7, and the molds may then be forced together by hydraulic pressure which joins the two sheets of the rubber at the inner and outer periphery of the cavity 11 and shears off the surplus stock; thus producing a tube.

The tube 1 is shown as having the cross section of an elongated loop with a contracted waist which has been found of beneficial form since such a tube when inflated in the tire casing is somewhat stretched at the sides and thus becomes relatively thinner at the sides and correspondingly thicker at the tread thereby placing the rubber where it is most effective. After the tube has been thus formed, it is removed from the forming mold as a complete closed annulus of raw rubber.

The patch may then be applied to its exterior in regions to be occupied by the valve nipple. This patch is preferably made of inner and outer sheets of raw rubber separated by sheets of fabric being of unequal size. The parts of such patch are shown in Fig. 4, wherein the two raw rubber sheets are designated 21 and 22 and the two pieces of fabric 23 and 24. This composite patch may be compressed tight against the outer surface of the tube 1, the rubber sheet adjacent the smaller sheet of fabric sheet surrounding the smaller fabric sheet, while the other rubber sheet engages the larger sheet of fabric and the two rubber sheets come together outside of the larger fabric sheet. The fabric thus becomes directly embodied and held in the patch, and the patch as a whole adheres to the exterior of the tube.

The tube with the patch thus applied may then be inserted in a separable vulcanizing mold such as mold 30 as shown in Fig. 8. When such a mold is locked and heat applied, the substance within the tube expands and gives sufficient pressure to force the soft rubber snugly against the surface of the mold cavity. The wall of the tube will then bend inwardly about the patch, the tube and patch are vulcanized as a unit. The exterior of the patch will now be flush with the exterior of the tube, and the extreme edges of the patch will be protected by the tube wall, while the material of the original tube has a depressed portion bent inwardly as at 5.

After vulcanization of the article, it is removed from the vulcanizing mold, and a hole made in the tube at the patch and a valve nipple 40 inserted through this hole, the rubber being stretched sufficiently to allow the head 41 of the nipple to pass through the hole. When the nut 42 is screwed thereon, the outer face of the patch and nipple will thus be clamped to the tube. This completes the tube forming the structure as shown in Figs. 1, 2 and 3.

While I have described in some detail the manner in which a pneumatic tube involving the principles of my invention may be made, it will be understood that this is merely given as illustrative of the manner of making such an article, since the present application is directed to the exteriorly reinforced hollow article of the character described.

From the foregoing description, however, it will be seen that I have invented a form of reinforced inner tubes for pneumatic tires which constitutes a distinct advance in the art. The patch is placed in position where it cannot work loose from the tube; the edges of the patch are protected; there is no danger of the patch piercing the tube. The tube, therefore, possesses all the advantages of a tube having an internally applied patch. At the same time, since the tube may be made of annular members, it has the advantages of a tube which naturally assumes an annular form and is not forced into an unnatural strained form when inflated.

Having thus described my invention, what I claim is:

1. An inner tube for pneumatic tires having a body portion and a reinforcing patch applied on the exterior thereof and seated in a depression in the body portion of the completed tube, the patch and the body portion extending flush with each other at their outer surfaces and the wall of the tube continuing as an inwardly off-set portion behind the patch, whereby there is produced a locally thickened article having a smooth outer wall.

2. As a new article of manufacture, a completed annular tubular member without transverse seams having a thickened portion projecting inward but not outward of the tube, and having the portion of the tube within the thickened portion continuous.

3. An annular tube made of vulcanized material having an exterior patch vulcanized thereon in a depression formed by bending inwardly the outer wall of the completed body portion, whereby the patch and outer face of the body portion form a smooth outer wall and a thickened region is produced.

4. As an article of the class described, a completely annular tubular member without a transverse seam, a patch applied on the exterior of said completed tubular member and seated in a depression in the wall thereof so as to extend substantially flush therewith.

5. An annular tube having annular seams only and a patch inserted on the outer face of said tubular member and seating in a recess in said face, the wall of the tube bulging inwardly behind the patch so that the patch is flush with the adjacent wall of the tube, while the tube is continuous inside of the patch.

6. A tubular rubber member formed from two annular pieces joined together at their edges to form a tube having longitudinal endless seams, a patch inserted on the outer face of said tubular member and seating in a depression in the finished tube and vulcanized thereto so as to form a part thereof.

7. In an article of the class described, a tubular rubber member having inner and outer peripheral seams, a patch applied on the exterior of said tubular member and across a portion of said inner peripheral seam, and vulcanized therewith, said patch being inserted in a depression in the wall of the finished tubular member.

8. In an annular inner tube for pneumatic tires, a tubular body portion, a patch secured on the outer surface of the completed tube and extending flush with the adjacent surface of the body portion, while the body portion continues with undiminished thickness behind the patch, the patch and body portion being vulcanized together to form an integral tube having a thickened portion with a smooth outer wall and a valve nipple extending through said reinforced portion.

9. In an inner tube for pneumatic tires, a tubular member having inner and outer peripheral seams, a patch applied on the exterior of the completed tubular member and across a portion of said inner peripheral seam, said patch being inserted in a depression in the wall of said article so as to extend flush therewith to form a reinforced tube and a valve nipple extending through the reinforced portion of the tube.

10. In an inner tube for pneumatic tires, a tubular member having its only seams at the inner and outer periphery, a patch applied on the exterior of the completed tubular member and across a portion of said inner peripheral seam, and vulcanized as a unit with the tube, said patch being inserted in a depression in the wall of said article so as to extend flush therewith on its outer surface and be protected at its edges, and a valve nipple extending through the reinforced portion of the tube.

11. An inner tube for pneumatic tires, formed from two annular pieces of rubber, said tube being thickened at one portion by an externally applied patch sunk into the wall of the completed tube and vulcanized simultaneously with it, and a valve nipple extending through said thickened portion.

In testimony whereof, I hereunto affix my signature.

WILLIAM E. ROBERTS.